(12) United States Patent
Micono et al.

(10) Patent No.: US 10,340,593 B2
(45) Date of Patent: Jul. 2, 2019

(54) SYSTEMS AND METHODS FOR PHASED ARRAY BEAM CONTROL

(71) Applicant: Raytheon Company, Waltham, MA (US)

(72) Inventors: Jeffrey G. Micono, Albuquerque, NM (US); Michael T. Pace, Albuquerque, NM (US); Michael A. Petty, Albuquerque, NM (US); Christopher S. Patscheck, Albuquerque, NM (US)

(73) Assignee: Raytheon Company, Waltham, MA (US)

( * ) Notice: Subject to any disclaimer, the term of this patent is extended or adjusted under 35 U.S.C. 154(b) by 479 days.

(21) Appl. No.: 15/053,278

(22) Filed: Feb. 25, 2016

(65) Prior Publication Data
US 2017/0250467 A1 Aug. 31, 2017

(51) Int. Cl.
*G01S 7/04* (2006.01)
*H01Q 3/00* (2006.01)
(Continued)

(52) U.S. Cl.
CPC ............... *H01Q 3/005* (2013.01); *G01S 7/04* (2013.01); *G01S 7/22* (2013.01); *G01S 13/66* (2013.01);
(Continued)

(58) Field of Classification Search
CPC .. G01S 13/66; G01S 2013/0254; G01S 13/72; G01S 13/003; G01S 13/4463;
(Continued)

(56) References Cited

U.S. PATENT DOCUMENTS 4,211,497 A 7/1980 Montgomery
5,842,125 A * 11/1998 Modzelesky ...... H04B 7/18539
455/426.1
(Continued)

OTHER PUBLICATIONS

PCT International Search Report and Written Opinion dated Feb. 14, 2017 for International Application No. PCT/US2016/061739; 14 Pages.
(Continued)

*Primary Examiner* — Olumide Ajibade Akonai
(74) *Attorney, Agent, or Firm* — Daly, Crowley, Mofford & Durkee, LLP

(57) ABSTRACT

Described embodiments provide techniques for controlling a phased array system by a control system including one or more distributed control stations. At least one of the control stations displays a control interface having a status window, a beam window, and a scan window. The control system instructs the phased array system to operate in an operating mode selected from among selectable operating modes displayed in the status window. In the beam window, at least one beam is selected from among selectable beams available to track a target. The control system instructs the phased array system to form the selected beam and assigns the formed beam to (i) track a target detected by the phased array system, or (ii) monitor a selected location. The scan window displays (i) targets tracked by the phased array system, and (ii) beams generated by the phased array system.

16 Claims, 13 Drawing Sheets

(51) Int. Cl.
  *G01S 13/02* (2006.01)
  *G01S 13/66* (2006.01)
  *G01S 13/72* (2006.01)
  *G06F 3/0481* (2013.01)
  *G01S 7/22* (2006.01)
  *G06F 3/0486* (2013.01)
  *G06F 3/0488* (2013.01)
  *H01Q 3/34* (2006.01)
  *G06F 3/0484* (2013.01)

(52) U.S. Cl.
  CPC ........ *G06F 3/0486* (2013.01); *G06F 3/04817* (2013.01); *G06F 3/04883* (2013.01); *H01Q 3/34* (2013.01); *G01S 13/72* (2013.01); *G01S 2013/0245* (2013.01); *G01S 2013/0254* (2013.01); *G06F 3/0481* (2013.01); *G06F 3/04842* (2013.01)

(58) Field of Classification Search
  CPC .... G01S 13/0209; G01S 13/426; G01S 13/88; G01S 13/89; G01S 2013/0245; G01S 2013/916; G01S 13/04; G01S 7/282; G01S 7/046; G01S 7/04; H01Q 3/2605
  See application file for complete search history.

(56) References Cited

U.S. PATENT DOCUMENTS

| | | | |
|---|---|---|---|
| 6,124,832 A * | 9/2000 | Jeon | H01Q 1/3275 342/375 |
| 6,377,966 B1 | 4/2002 | Cooper et al. | |
| 6,489,951 B1 | 12/2002 | Wong et al. | |
| 6,784,838 B2 * | 8/2004 | Howell | H01Q 3/26 342/377 |
| 6,989,786 B1 * | 1/2006 | Dong | H04B 7/18515 342/352 |
| 7,479,949 B2 | 1/2009 | Jobs et al. | |
| 8,781,791 B2 | 7/2014 | Panther et al. | |
| 8,963,842 B2 | 2/2015 | Andrews et al. | |
| 9,092,748 B2 | 7/2015 | Greenlaw et al. | |
| 9,766,324 B2 * | 9/2017 | Katz | G01S 7/4008 |
| 2004/0168131 A1 | 8/2004 | Blumberg | |
| 2007/0018882 A1 * | 1/2007 | Manoogian | G01S 13/4418 342/80 |
| 2007/0094618 A1 | 4/2007 | Yoshida | |
| 2007/0101299 A1 | 5/2007 | Shaw et al. | |
| 2009/0121923 A1 * | 5/2009 | Mainds | G01S 7/298 342/185 |
| 2010/0156809 A1 | 6/2010 | Nutaro et al. | |
| 2010/0171693 A1 | 7/2010 | Tamura et al. | |
| 2011/0302519 A1 | 12/2011 | Fleizach et al. | |
| 2012/0242591 A1 | 9/2012 | Kawalkar | |
| 2014/0125620 A1 | 5/2014 | Panther et al. | |
| 2014/0300555 A1 | 10/2014 | Rogers | |
| 2014/0302869 A1 * | 10/2014 | Rosenbaum | H04W 4/026 455/456.1 |
| 2015/0268328 A1 | 9/2015 | Johnson et al. | |
| 2015/0268337 A1 * | 9/2015 | Moe | G01S 13/04 701/2 |

OTHER PUBLICATIONS

Euro-Art GMBH, "COBRA Counter Battery Radar;" Marketing Brochure COBRA Radar; Jan. 1, 2000; 28 Pages.
Raytheon "Patriot Modern Man Station;" www.raytheon.com/capabilities/rtnwcm/groups/gallery/documents/digitalasset/rtn_194015; Jan. 1, 2014; 1 Page.
Lee et al., "A Analysis of the User Interface for the Russian Air Defense Weapon Systems;" Korean Institute of Industrial Engineer; Apr. 9, 2015; 18 Pages.
Guerrero, "COBRA—Das Artillerieortungsradar der Zukunft;" SOGAFLASH; Jan. 1, 2002; 2 Pages.
Downloaded Nov. 8, 2015 for U.S. Appl. No, 13/857,263; 156 pages.
The Ottawa Citizen "NAV Canada strips away paper;" article by Jennifer Campbell; Dec. 30, 2008; 3 pages.
Hen et al., "The Adaptive Hybrid Cursor: A pressure-based Target Selection Technique for Pen-based User Interfaces"; Kochi University of technology, Japan, University of Toronto, Canada, and University of Washington, Seattle, WA; 14 pages.
Nobeltec: "InSight Radar 2 (IR2)" Radar Operations Manual; 67 pages.
Torres et al. : "Multifunction Phased-Array Radar for Weather Survelliance"; ERAD 2010—The Sixth European Conference on Radar in Meteorology and Hydrology; Feb. 22, 2010; 6 pages.
Priegnitz et al.: "Enhancements to the National Weather Radar Teatbed Phased Array Radar Storm Tracking Function"; Cooperative Institute for Mesoscale Meteorological Studies, The University of Oklahoma; NOAA/OAR National Severe Storms Laboratory, Norman Oklahoma; 6 pages.
Priegnitz et al. "Detection and Adaptive Scheduling on the NWRT Phased-Array Radar" Cooperative Institute for Mesoscale Meteorological Studies, The University of Oklahoma; NOAA/OAR National Severe Storms Laboratory, Norman Oklahoma; 5 pages.
Eaves et al. "Principles of Modern Radar" section 17.1.4; pp. 1-2 and 543-544 (4 pages); date of publication Jun. 1987.
PCT International Preliminary Report dated Sep. 7, 2018 for International Application No. PCT/US2016/061739; 10 Pages.
Response (with Amended Claims) to European Communication dated Aug. 9, 2018 for European Application No. 16804966.6; Response filed Nov. 27, 2018; 13 Pages.

* cited by examiner

SYSTEMS AND METHODS FOR PHASED ARRAY BEAM CONTROL

BACKGROUND

Phased array systems include numerous antenna elements, and can form beams by selectively activating all or a portion of antenna elements of a given array. Scanning or steering of the beams can be accomplished by shifting the phase of the signals emitted from the antenna elements in order to provide constructive and/or destructive interference. The ability to form and steer a beam permits multiple functions to be performed by the phased array system. Further, modern phased array systems often operate simultaneously in multiple frequency bands. For example, phased array systems might be employed in radar systems that use the beams to derive information (e.g., "telemetry data") about remote targets.

SUMMARY

This Summary is provided to introduce a selection of concepts in a simplified form that are further described below in the Detailed Description. This Summary is not intended to identify key or essential features or combinations of the claimed subject matter, nor is it intended to be used to limit the scope of the claimed subject matter.

Described embodiments provide techniques for controlling a phased array system by a control system including one or more distributed control stations. At least one of the control stations displays a control interface having a status window, a beam window, and a scan window. The control system instructs the phased array system to operate in an operating mode selected from among selectable operating modes displayed in the status window. In the beam window, at least one beam is selected from among selectable beams available to track a target. The control system instructs the phased array system to form the selected beam and assigns the formed beam to (i) track a target detected by the phased array system, or (ii) monitor a selected location. The scan window displays (i) targets tracked by the phased array system, and (ii) beams generated by the phased array system.

Embodiments may include one or more of the following features. In an embodiment, the at least one selectable operating mode of the phased array system includes at least one of an open loop mode and a closed loop mode. The control station receives a selection of the closed loop operating mode of the phased array system in the status window, receives a selection of an available beam in the beam window, receives a drag of the selected beam from the beam window over a desired target in the scan window, and assigns the selected beam to track the desired target. In an embodiment, after receiving the selection of the closed loop mode and receiving the selection of the available beam, the control system causes the phased array system to form the selected beam at a determined azimuth and elevation. In response to telemetry data of the formed beam, the azimuth and elevation of the formed beam are automatically adjusted to acquire and track a desired target. In an embodiment, the control system updates the one or more beams displayed in the beam window when a beam is assigned to track the desired target. In an embodiment, the control system receives a selection of the open loop operating mode of the phased array system in the status window, receives a selection of an available beam in the beam window, receives a drag of the selected beam from the beam window over a desired region in the scan window, and assigns the selected beam to monitor the desired region. In an embodiment, after receiving the selection of the open loop mode and receiving the selection of the available beam, the control system instructs the phased array system to form the selected beam at a determined azimuth and elevation. In an embodiment, the control system updates the one or more beams displayed in the beam window when a beam is assigned to monitor the desired region. In an embodiment, the scan window displays telemetry data of at least one assigned target. The control system provides feedback indicative of the telemetry data, where the feedback is at least one of: audible feedback, visual feedback and haptic feedback. In an embodiment, the one or more control stations are in communication via a communications network and the one or more control stations are located in separate geographic locations. In an embodiment, the one or more control stations are located in separate geographic locations than the phased array system. In an embodiment, the one or more beams are operable in at least one of: an L-frequency band, an S-frequency band, and a C-frequency band. In an embodiment, wherein each of the one or more control stations includes a touchscreen. The control system receives input from an operator of the control station by one or more touch gestures, wherein the one or more touch gestures include at least one of: a tap, a double tap, a multiple tap, a tap and hold, a tap and drag, a release, and a drag and drop. In an embodiment, a single tap selects an operating mode of the phased array system, a double tap turns off a generated beam, a tap and hold shows information associated with a generated beam, a tap and drag selects an available beam and moves the available beam over a target or region, and a release generates the beam and assigns the beam to monitor the target or region. In an embodiment, the control system operates the phased array system to acquire a target along a dynamic path, the dynamic path set by an operator of the phased array system. In an embodiment, the control system receives inputs to steer an assigned beam around an unintended or interfering target.

In another aspect, a distributed control system is provided for a phased array system. The control system includes one or more distributed control stations each comprising at least one screen. Each control station displays, on the at least one screen, a control window of the phased array system, the control window having a status window, a beam window, and a scan window. In the status window, at least one selectable operating mode of the phased array system is displayed. In the beam window, one or more beams of the phased array system available to track a target are displayed. The control system operates the phased array system in a selected operating mode and receives a selection input selecting at least one beam and cause the phased array system to form the selected at least one beam. The formed beam is assigned to (i) track a selected target detected by the phased array system, or (ii) monitor a selected location. The scan window displays (i) targets tracked by the phased array system, and (ii) beams formed by the phased array system. The control system causes the phased array system to track each of the assigned targets and monitor each of the assigned locations.

Embodiments may include one or more of the following features. In an embodiment, the at least one selectable operating mode of the phased array system is at least one of: an open loop mode and a closed loop mode. In an embodiment, each control station receives a selection input selecting the closed loop operating mode of the phased array system in the status window, receives a selection input selecting an available beam in the beam window, receives a selection input dragging the selected beam from the beam window over a desired target in the scan window, causes the phased array system to generate the selected beam at a determined azimuth and elevation, assigns the selected beam to track the desired target and, in response to telemetry data of the formed beam, automatically adjust the azimuth and elevation of the formed beam to acquire and track the desired target, and updates the one or more beams displayed in the beam window when a beam is assigned to track the desired target. In an embodiment, each control station receives a selection input selecting the open loop operating mode of the phased array system in the status window, receives a selection input selecting an available beam in the beam window, receives a selection input dragging the selected beam from the beam window over a desired region in the scan window, causes the phased array system to generate the selected beam at a determined azimuth and elevation, assigns the selected beam to monitor the desired region, and updates the one or more beams displayed in the beam window when a beam is assigned to track the desired target. In an embodiment, at least one of the one or more control stations provides feedback indicative of the telemetry data, the feedback including at least one of: audible feedback, visual feedback and haptic feedback. The one or more control stations are in communication via a communications network, and each of the one or more control stations includes a touchscreen configured to receive input from an operator of the control station by one or more touch gestures.

BRIEF DESCRIPTION OF THE DRAWING FIGURES

Other aspects, features, and advantages of the described embodiments will become more fully apparent from the following detailed description, the appended claims, and the accompanying drawings in which like reference numerals identify similar or identical elements. Reference numerals that are introduced in the specification in association with a drawing figure might be repeated in one or more subsequent figures without additional description in the specification in order to provide context for other features.

DETAILED DESCRIPTION

Described embodiments control digital beam formation for phased array systems. The distributed beam control system described herein provides one or more operators the ability to command and monitor many beams simultaneously via one or more networked control stations. For example, the phased array system might be an airborne, sea-based, or land-based system that is controlled by multiple operators, for example one or more local operators and one or more geographically remote operators (e.g., for an airborne system, a local airborne operator and remote sea- or land-based operators).

Illustrative embodiments enter into a beam acquisition mode to acquire a target along a dynamic path rather than a fixed raster scan. Illustrative embodiments control numerous beams to track numerous targets and over large scan volumes. Embodiments can allow distributed control of multiple beams and tracking numerous targets. Further, embodiments may provide secure and coordinated control of signal generators and other system equipment.

Some embodiments provide touchscreen-based gesture beam control where an operator can initiate beams and operate the beam in an open loop tracking mode (e.g., "stand up beams"). The operator can transition beams from the open loop tracking mode to a closed loop tracking mode. Further, the operator can control individual beams of a digital beam forming telemetry system that might have dozens of beams at various frequencies.

Figure 1:
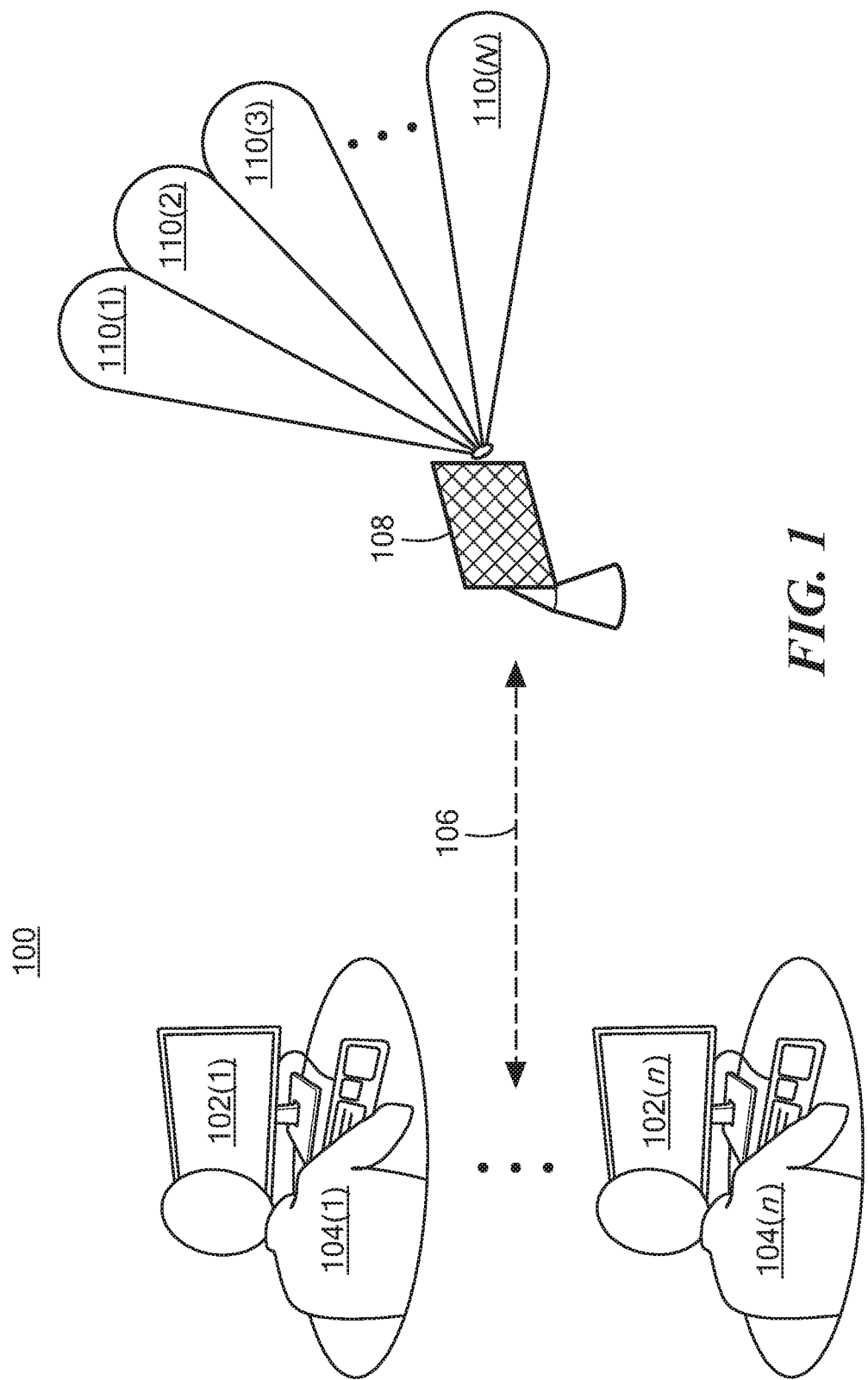
FIG. 1 is a block diagram showing an illustrative phased array system in accordance with described embodiments.

Referring to FIG. 1, an illustrative phased array system 100 is shown that includes a phased array 108 and at least one control station, shown as control stations 102(1)-102(n). Control stations 102(1)-102(n) can be operated by one or more human operators, shown as operators 104(1)-104(n). As described, control stations 102(1)-102(n) and, thus, operators 104(1)-104(n) might be geographically remote from each other, and from phased array 108. For example, control stations 102(1)-102(n) might be linked to phased array 108, and to each other, by communication network 106. For simplicity, control stations 102(1)-102(n) will be referred to generally as "control station 102," and operators 104(1)-104(n) will be referred to generally as "operators 104."

Communication network 106 might be a wired or wireless network and communicate over, for example, the Internet. In some embodiments, communication network 106 might be a secure connection employing standard networking protocols, such as TCP/IP or UDP. In response to control commands received from control station 102, phased array system 100 generates one or more beams, shown as beams 110(1)-110(N).

In some embodiments, phased array system 100 includes: receive only multi-target tracking systems for telemetry downlink from missile systems as well as space based assets. These systems can cover multiple frequencies from spatial diverse targets by utilizing large scan volumes in azimuth and elevation. Received data streams can be processed digitally or converted back to analog for legacy processing. Thus, phased array system 100 is capable of digital beam-forming to generate multiple beams to track multiple targets.

Figure 2:
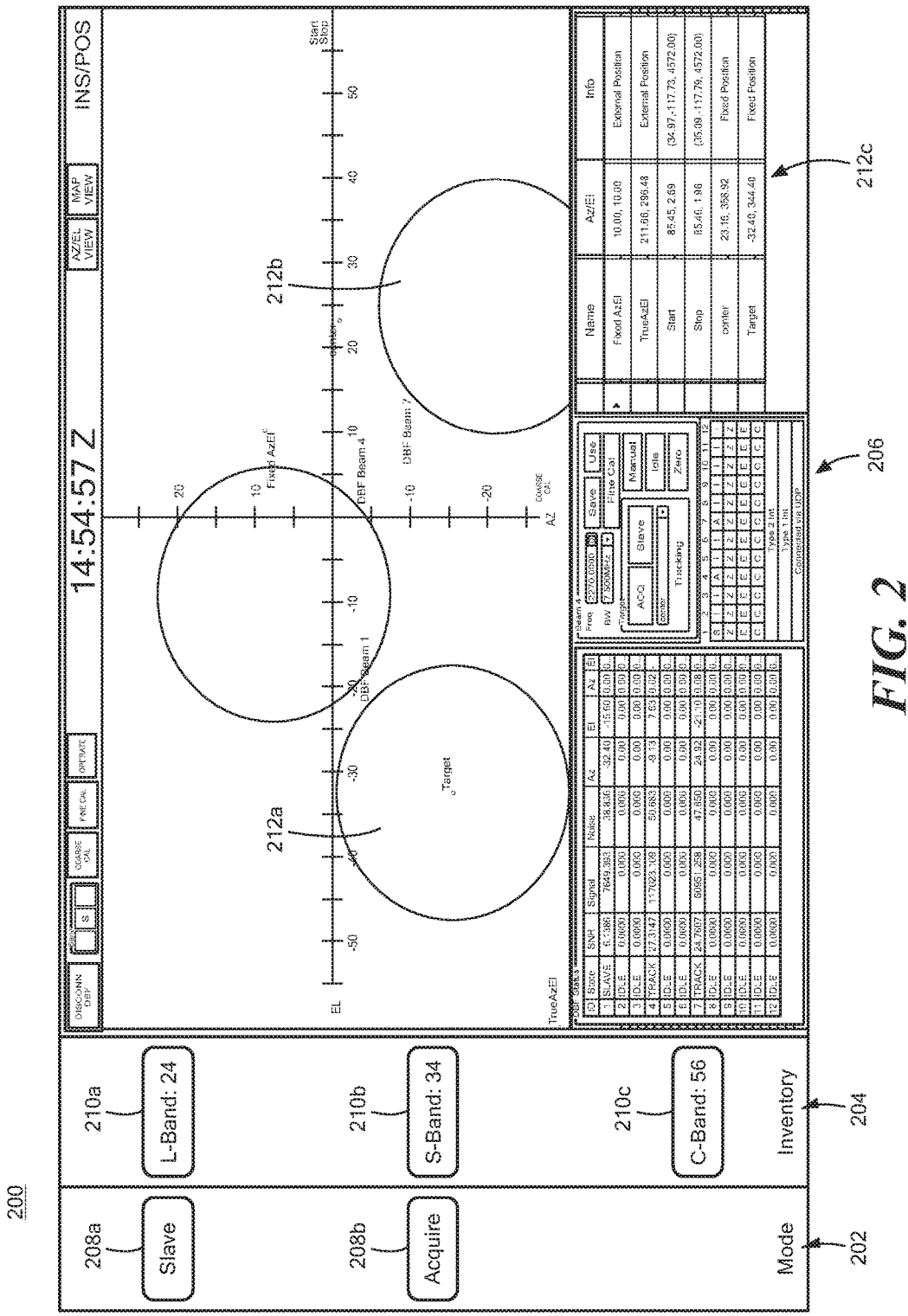
FIG. 2 is a diagram showing an illustrative control interface of the phased array system of FIG. 1.

Referring to FIG. 2, an illustrative graphical user interface 200 of control stations 102(1)-102(n) is shown. As shown, graphical user interface 200 includes operating mode window 202, beam inventory window 204 and scan volume window 206. In some embodiments, operating mode window 202 includes one or more icons (e.g., slave icon 208a and acquire icon 208b) that represent available operational modes of phased array system 100. Beam inventory window 204 includes one or more icons (e.g., L-band beam icon 210a, S-band beam icon 210b and C-band beam icon 210c) that represent available (or idle) beams that can be formed by phased array system 100. Scan volume window 206 includes visual representations of beams (e.g., a beam in a tracking mode, shown as beam icon 212a, and a beam in slave mode, shown as beam icon 212b). Scan volume window 206 might also display telemetry or other data relating to one or more targets (e.g., shown generally as display data 212c). Thus, graphical user interface 200 provides graphical information about the operation of phased array system 100 to operator 104 of control station 102. Further, graphical user interface 200 allows operator 104 of control station 102 to control, for example via mouse and keyboard input and/or touch gestures, operation of phased array system 100.

Figure 3:
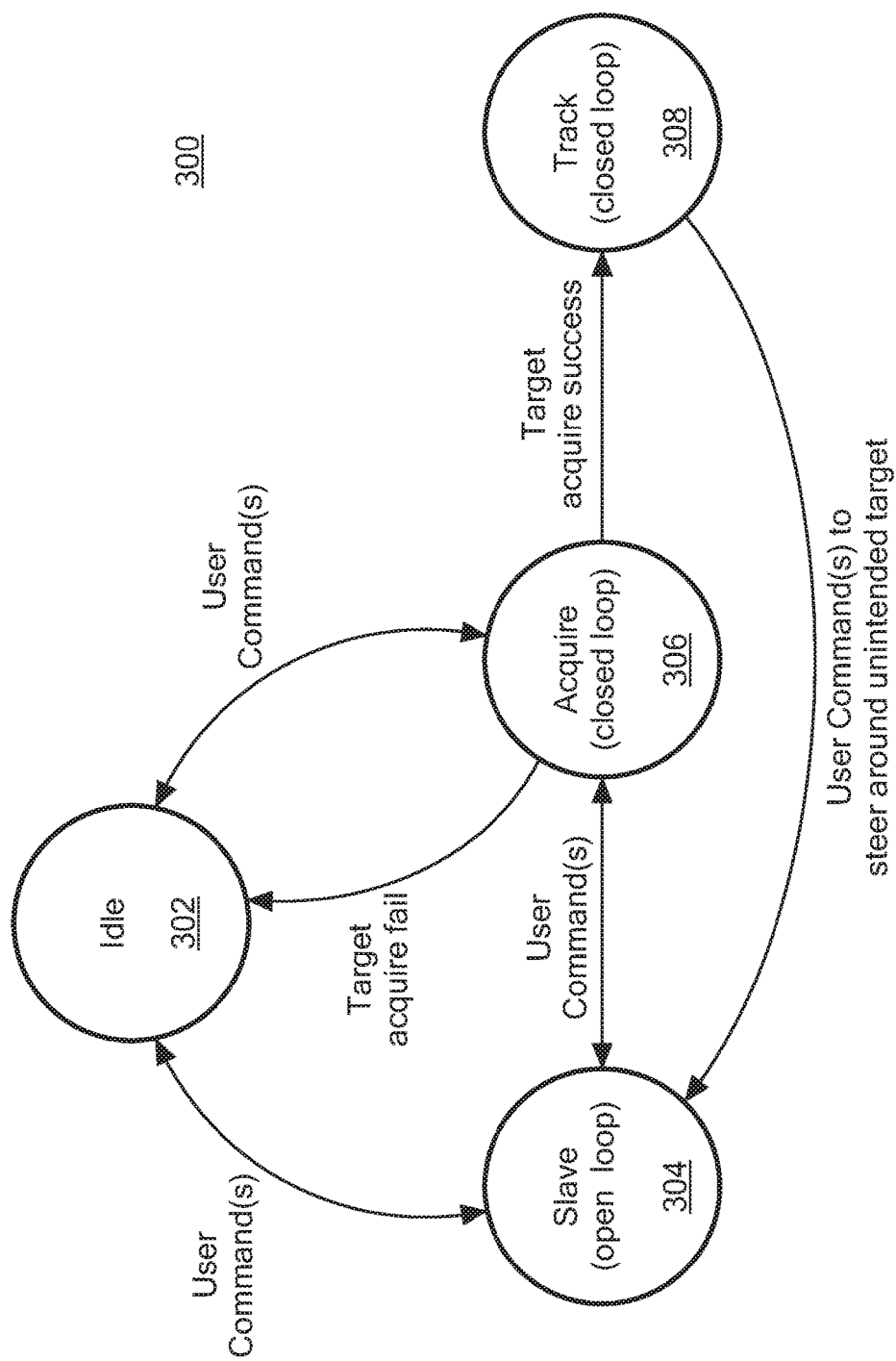
FIG. 3 is a logic state diagram showing illustrative control states of the phased array system of FIG. 1.

Referring to FIG. 3, in illustrative embodiments, each beam of phased array system 100 can be in one of the following states: idle state 302, slave (open loop) state 304, acquire (closed loop) state 306 and track (closed loop) state 308. In idle state 302, no beam exists. Idle beams are shown as available beams in the beam inventory (e.g., beam inventory window 204) of graphical user interface 200.

In slave (open loop) state 304, the beam is generated by phased array system 100, and control system 102 controls phased array 108 to direct the beam to a particular azimuth and elevation. The beam stays at that azimuth and elevation until commanded otherwise by control system 102. Beams in slave mode are shown as active beams in the scan volume window (e.g., 206) of graphical user interface 200.

In acquire (closed loop) state 306, the beam is generated by phased array system 100, and control system 102 controls phased array 108 to direct the beam to a particular azimuth and elevation. Phased array system 100 autonomously examines the targets dynamics by means of a tracking process and modifies the beam pointing to maximize the signal-to-noise ratio (SNR) (e.g., phased array system 100 tracks an acquired target by steering the beam in response to the tracking process). Beams in acquire mode are shown as active beams in the scan volume window (e.g., 206) of graphical user interface 200.

Beams transition between states 302, 304, 306 and 308 based on operator commands input to graphical user interface 200. For example, to generate a beam in slave mode, operator 104 might select slave mode (e.g., by selecting icon 208a) and then select and drag a desired beam over a desired target region (e.g., by selecting and dragging one of beam icons 210a, 210b and 210c over a desired target region in scan volume window 206). As the beam is dragged into scan volume window 206, the selected beam is formed and enters slave mode. In slave mode, operator 104 controls the beam position and receives feedback about the beam status. Further, operator 104 can command the beam to enter acquire mode (e.g., state 306), for example by a touchscreen gesture, mouse selection, or other input. For example, in an embodiment, a drag and drop gesture by operator 104 might be used to select a beam, select a target region, form the beam, and when the beam is "dropped" over the target area, cause the beam to transition from slave mode (e.g., state 304) to acquire mode (e.g., state 306). If phased array system 100 fails to acquire a target, the beam might be turned off (e.g., "torn down") by transitioning from acquire mode (e.g., state 306) to idle mode (e.g., state 302). In other embodiments, if phased array system 100 fails to acquire a target, the beam might transition from acquire mode (e.g., state 306) to slave mode (e.g., state 304).

Similarly, to generate a beam in acquire mode, operator 104 might select acquire mode (e.g., by selecting icon 208b) and then select and drag a desired beam over a desired target (e.g., by selecting and dragging one of beam icons 210a, 210b and 210c over a desired target in scan volume window 206). For example, to generate a beam in acquire mode, operator 104 might select acquire mode (e.g., by selecting icon 208b) and then select and drag a desired beam over a desired target (e.g., by selecting and dragging one of beam icons 210a, 210b and 210c over a desired target in scan volume window 206). As the beam is dragged into scan volume window 206, the selected beam is formed and enters acquire mode. In acquire mode, phased array system 100 is automatically kept in acquire mode (e.g., state 306) and provides feedback to operator 104. If phased array system 100 is unable to acquire a target, then the beam position continues to respond to commands from operator 104 (e.g., is re-commanded to go into acquisition mode). If phased array system 100 successfully acquires a target, the beam is locked on the target in closed loop tracking mode (e.g., state 308). The beam might be turned off (e.g., "torn down") by transitioning from acquire mode (e.g., state 306) to idle mode (e.g., state 302).

Described embodiments allow operator 104 to steer a beam around an interfering or unintended target. For example, if phased array system 100 enters into closed loop tracking mode (e.g., state 308) on an unintended target, operator 104 can steer the beam around the interfering or unintended target. For example, operator 104 might be able to select the tracking beam and drag the beam around the interfering or unintended target. Thus, in some embodiments, operator 104 can command a beam in closed loop track mode (e.g., state 308) into slave mode (e.g., state 304), steer the beam around the interfering or unintended target, and re-enter acquire mode (e.g., state 306) to acquire and track the actual intended target (e.g., enter state 308).

In acquire mode (e.g., state 306), track mode (e.g., state 308) or slave mode (e.g., state 304), operator 104 might command a formed beam to turn off (e.g., be "torn down" or "deconstructed"). In some embodiments, a double tap gesture might be employed to allow operator 104 to deconstruct a formed beam.

Additionally, beams can transition from acquire (closed loop) state 306 to idle state 302 if the beam is not able to acquire a target.

In either slave mode (e.g., state 304) or acquire mode (e.g., state 306), once a beam is formed, the display of available beams in beam inventory window 204 is updated to reflect that a given beam has been generated and is no longer available to be assigned. In other words, beam inventory window 204 displays all beams in idle mode (e.g., idle state 302) as available to be assigned (e.g., available to be formed in either slave mode (e.g., state 304) or acquire mode (e.g., state 306).

Feedback to operator 104 might be provided as any combination of visual, audible, or haptic feedback. For example, in some embodiments, as the beam is moved closer towards a telemetered target in scan volume window 206, feedback is provided to operator 104 signifying data of interest, such as relative signal strength, bit error rate, etc. For example, visual feedback might include changing the beam color or screen color or displaying a status icon. Haptic feedback might include providing touch feedback to the operator, for example, as a beam is acquiring a target.

Figure 4:
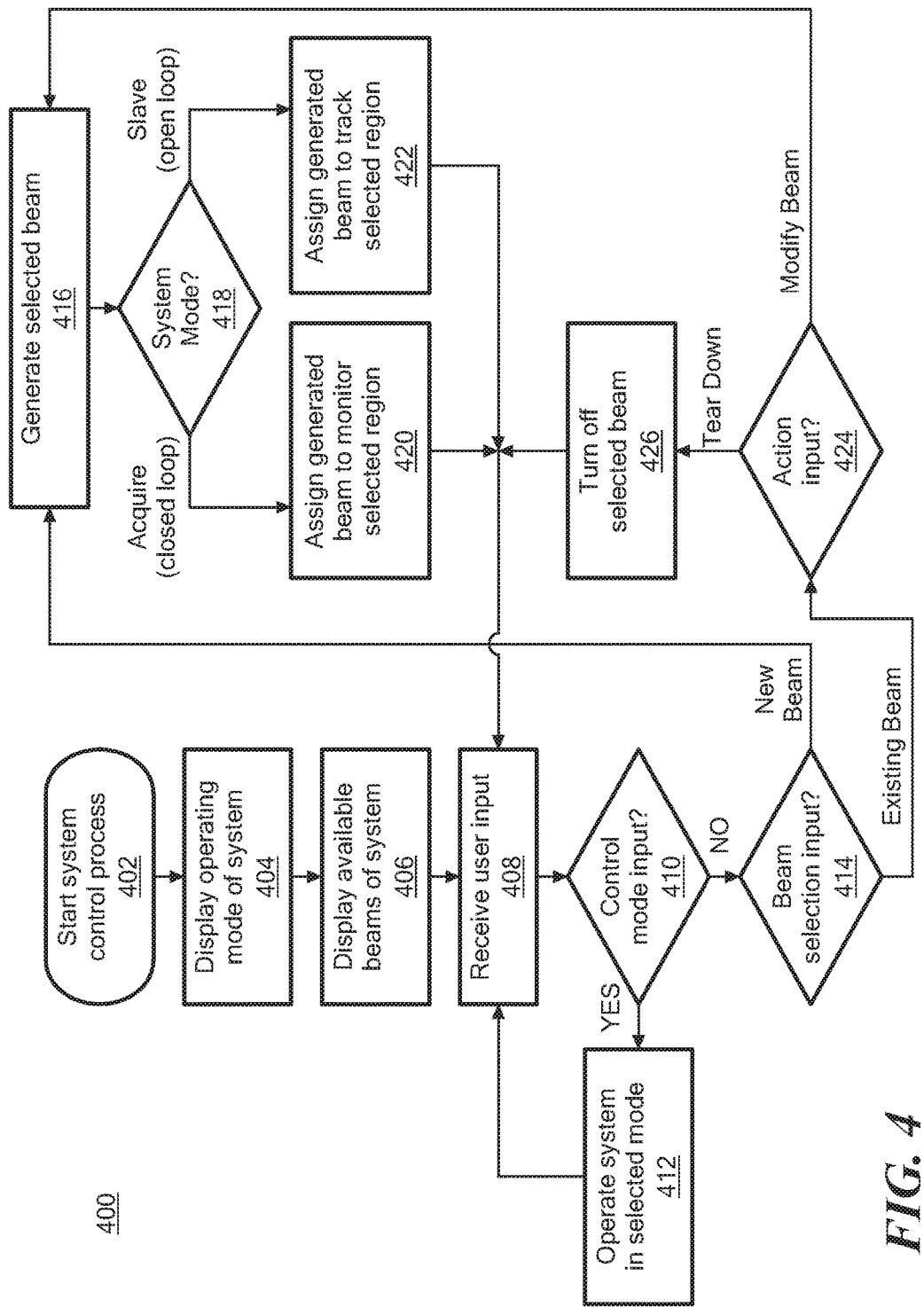
FIG. 4 is a flow diagram showing an illustrative control technique of the phased array system of FIG. 1.

Referring to FIG. 4, in conjunction with FIGS. 1-3, control process 400 for phased array system 100 is shown. Control process 400 starts at block 402, for example at an initial startup of phased array 108 and/or at least one of control stations 102(1)-102(n). At block 404, the possible operating modes of phased array system 100 are displayed on a graphical user interface (e.g., 200) of at least one of control stations 102(1)-102(n). For example, as described regarding FIG. 3, phased array system 100 can operate in various operating modes for each beam that it can generate. For example, for each beam, phased array system 100 can operate in an idle mode (e.g., state 302) where the beam is not generated (e.g., is idle), slave mode (e.g., state 304)

where the beam is generated and directed to a particular azimuth and elevation, acquire mode (e.g., state 306) where the beam is generated and phased array system 100 modifies the beam location (e.g., steers the beam) attempting to maximize the signal-to-noise ratio (SNR) to acquire a target, and track mode (e.g., state 308) where phased array system 100 acquires and locks onto a target and tracks the acquired target by steering the beam in response to the received SNR).

At block 406, an inventory of beams available to be generated by phased array system 100 is displayed on a graphical user interface (e.g., 200) of at least one of control stations 102(1)-102(n). For example, some embodiments use beam inventory window 204 to show one or more icons (e.g., L-band beam icon 210a, S-band beam icon 210b and C-band beam icon 210c) that represent available (or idle) beams that can be formed by phased array system 100. At block 408, one of control stations 102(1)-102(n) receives input from an operator (e.g., one of operators 104). For example, the operator might make a selection of an operating mode and/or beam displayed on graphical user interface 200 by, for example, a touch gesture or mouse click.

At block 410, if the operator input received at block 408 is a selection of an operating mode of a beam of phased array system 100, then at block 412, phased array system 100 is operated in the selected mode for a selected beam. For example, for each beam, an operator can select to operate a beam in slave mode (e.g., state 304) where the beam is generated and directed to a particular azimuth and elevation desired by the operator or acquire mode (e.g., state 306) where the beam is generated and the beam location is modified (e.g., steered) to acquire a target. Once phased array system 100 is operated in the selected mode at block 412, then process 400 proceeds to block 408, to await for another operator selection (e.g., for the operator to select a desired beam, etc.). If, at block 410, the operator input received at block 408 is not a selection of an operating mode, then process 400 proceeds to block 414.

At block 414, if the operator input received at block 408 is a selection of an available beam (e.g., from beam inventory window 204), then at block 416, phased array system 100 generates the selected beam in the selected mode (e.g., the mode selected at blocks 410 and 412). At block 418, if the selected mode is slave mode (e.g., state 304), then at block 420, the selected and generated beam is directed to a region selected by the operator, for example an azimuth and elevation selected by the operator, for example by a touch gesture in scan volume window 206. At block 418, if the selected mode is acquire mode (e.g., state 306), then at block 422, the selected and generated beam is directed to acquire and track a target selected by the operator, for example by a touch gesture in scan volume window 206. After blocks 420 and 422, process 400 proceeds to block 408, for example to receive another operator input. If, at block 414, the operator input received at block 408 is not a selection of an available beam, then process 400 proceeds to block 424.

At block 424, the operator input received at block 408 is a selection of a beam that already exists. The operator can select to tear down (e.g., de-form or turn off the beam) or to modify the selected beam. If the operator selects to tear down the selected beam, then process 400 proceeds to block 426. At block 426, the selected beam is torn down (e.g., de-formed or turned off), and the torn down beam returns to the beam inventory (e.g., beam inventory window 204) as an available beam for selection by the operator. Process 400 proceeds to block 408, for example to receive another operator input. If, at block 424, the operator selects to modify the selected beam, then process 400 proceeds to block 416 to generate the modified beam (e.g., to modify the existing beam).

Figure 5:
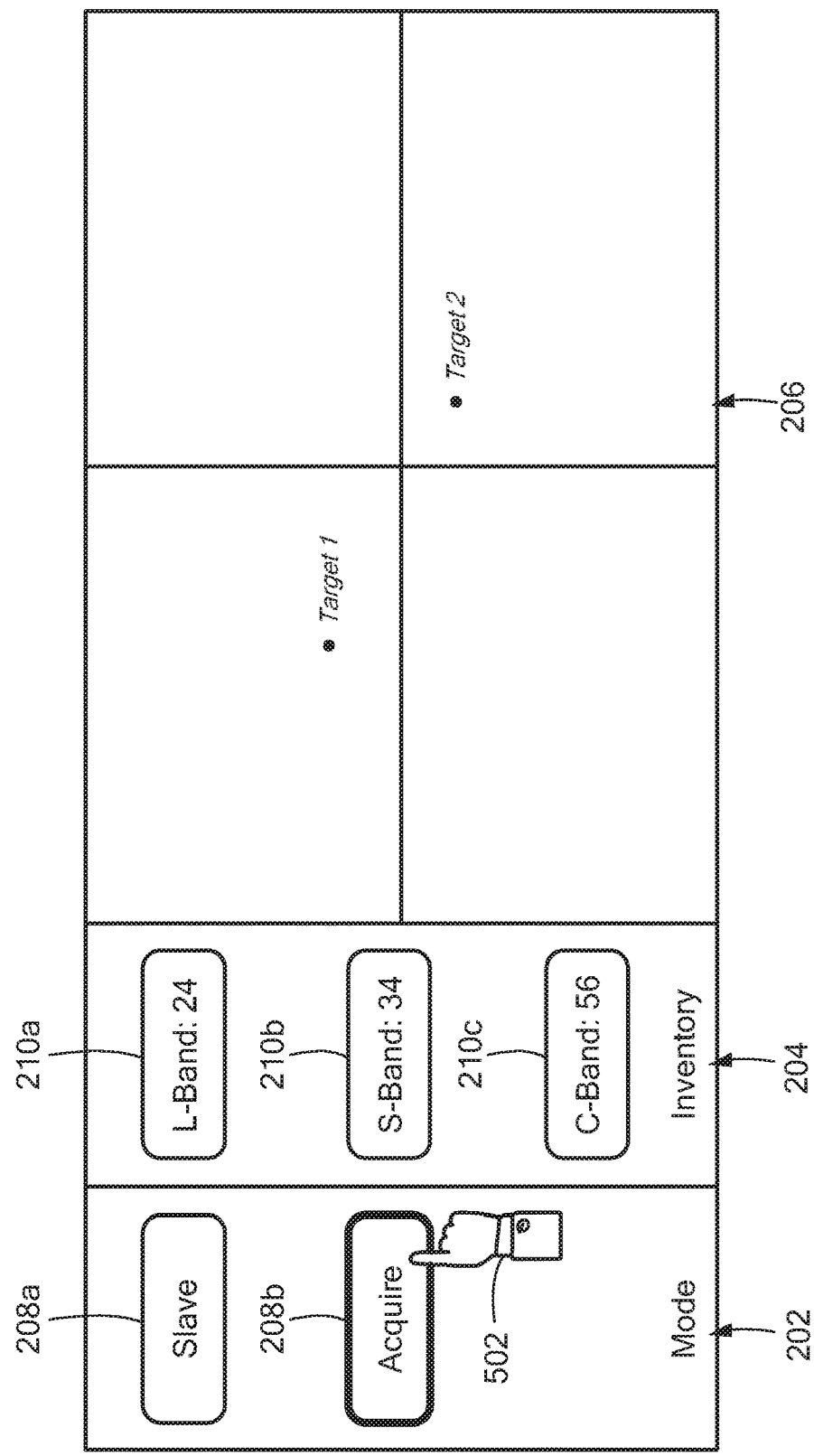
FIGS. 5-12 are diagrams showing illustrative uses of the control interface of the phased array system of FIG. 2.
Figure 6:
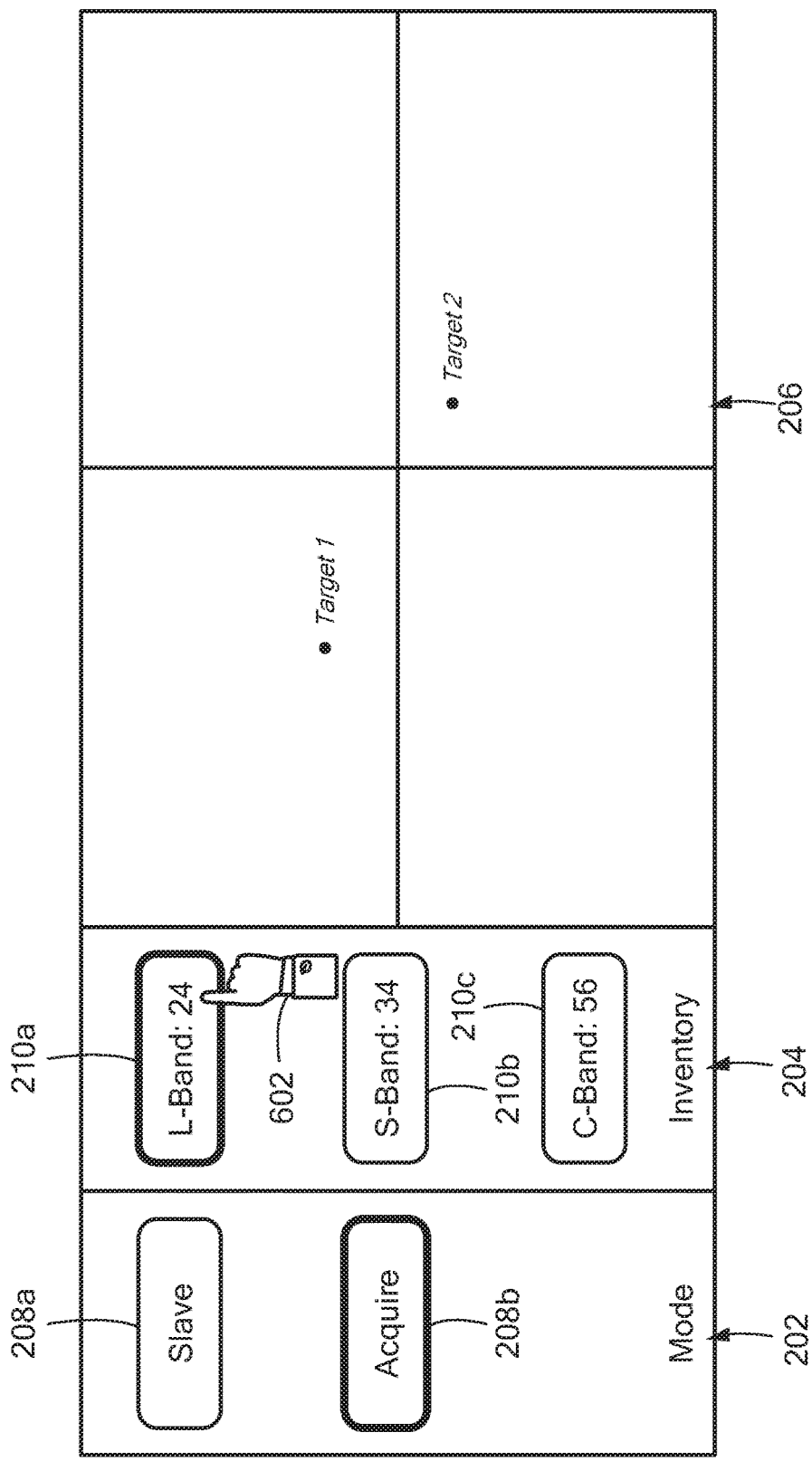

Referring to FIGS. 5-12, illustrative operator operations of graphical user interface 200 are shown. As shown in FIG. 5, an operator of the system selects acquire icon 208b of operating mode window 202, for example by a touch gesture represented by hand icon 502. For example, the touch gesture to select acquire icon 208b might be a single tap. Selecting acquire icon 208b indicates that the operator desires a selected beam to be formed by phased array system 100 and operated in acquire mode. As shown in FIG. 6, after selecting acquire icon 208b as shown in FIG. 5, the operator selects one of the available beams from beam inventory window 204, for example selecting an L-band beam (e.g., L-band beam icon 210a) by a touch gesture represented by hand icon 602. Selecting L-band beam icon 210a indicates that the operator desires an L-band beam to be formed by phased array system 100 and operated in acquire mode.

Figure 7:
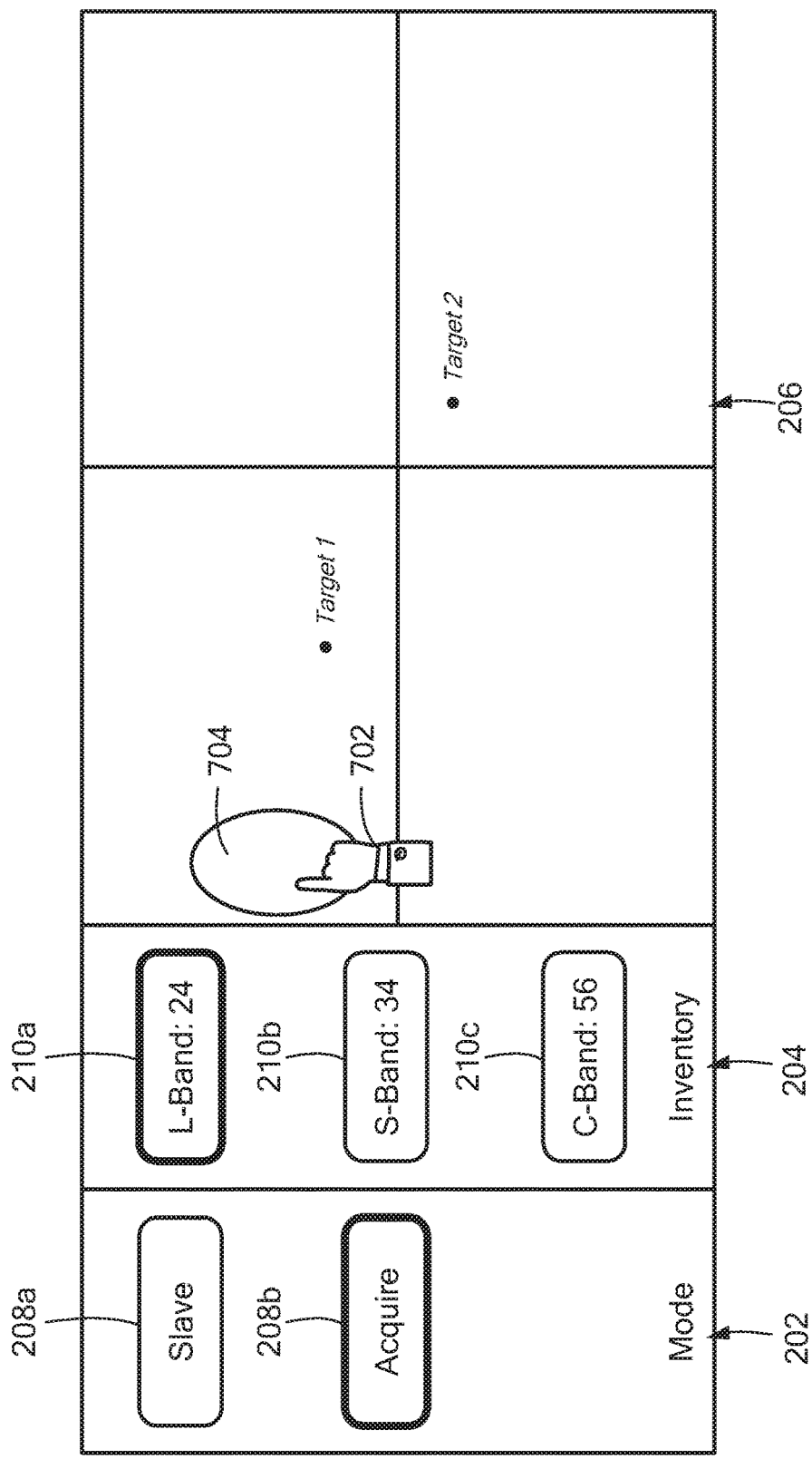

In some embodiments, the touch gesture to select L-band beam icon 210a might be to tap L-band beam icon 210a and then drag the beam into scan volume window 206, as shown in FIG. 7. For example, the operator might drag the beam to a particular region of scan volume window 206 (the region representing an azimuth and elevation for the formed beam), as represented by hand icon 702. A formed beam is represented in scan volume window 206, for example by beam icon 704. Releasing the drag gesture instructs phased array system 100 to form the beam at the azimuth and elevation corresponding to the region where the beam was dropped, and phased array system 100 operates the beam in acquire mode to acquire a target.

Figure 8:
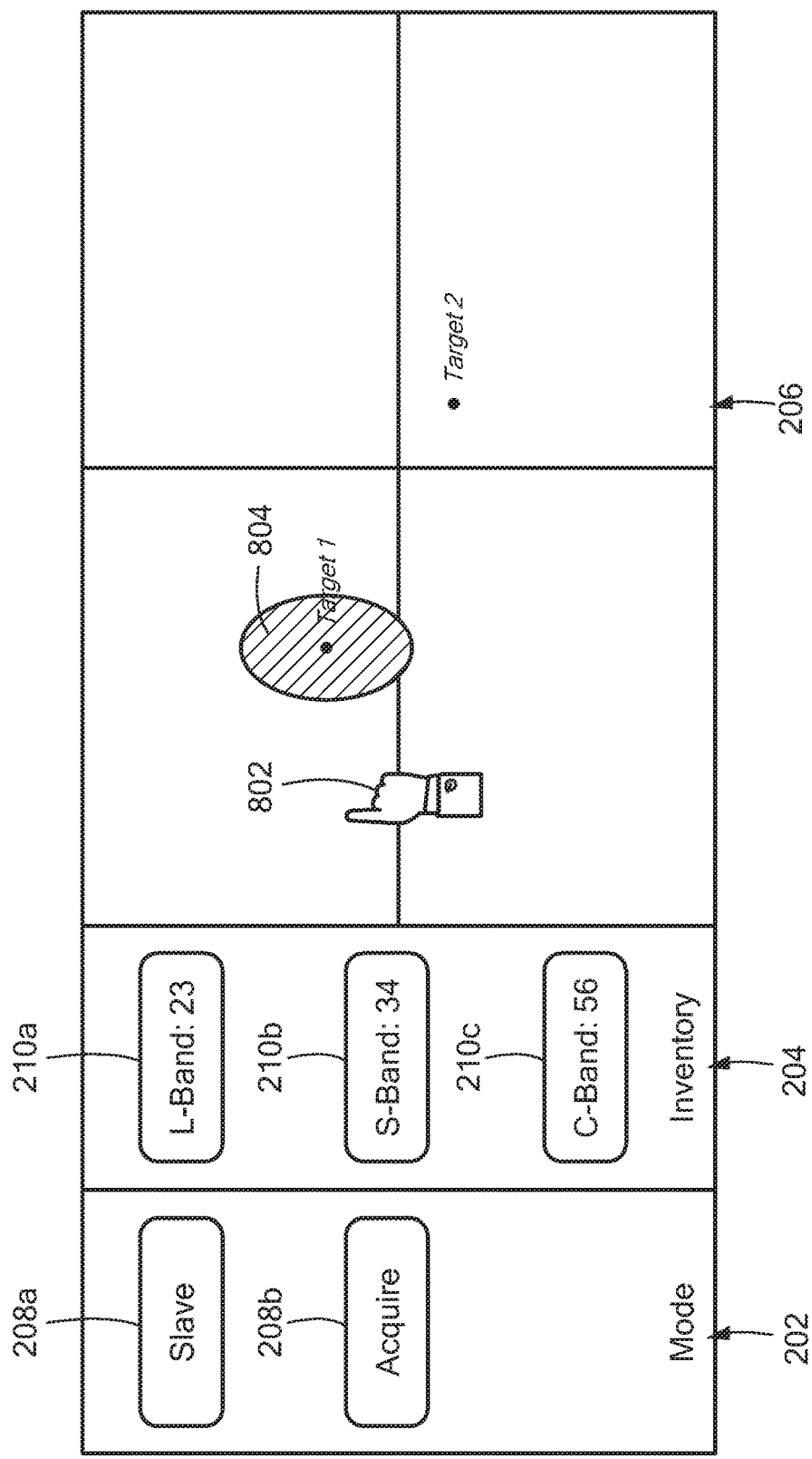

As shown in FIG. 8, in acquire mode, the beam formed by phased array system 100 might automatically locate, acquire, lock on and track a target in or near the selected region (e.g., azimuth and elevation) without operator intervention (e.g., hand icon 802 is not near beam icon 804 as it located, acquired and locked onto target 1). As shown in FIG. 8, a beam that has acquired and locked onto a target might be represented by beam icon 804, which is colored, filled, or otherwise visually indicates that the beam has acquired and is tracking a target.

Figure 9:
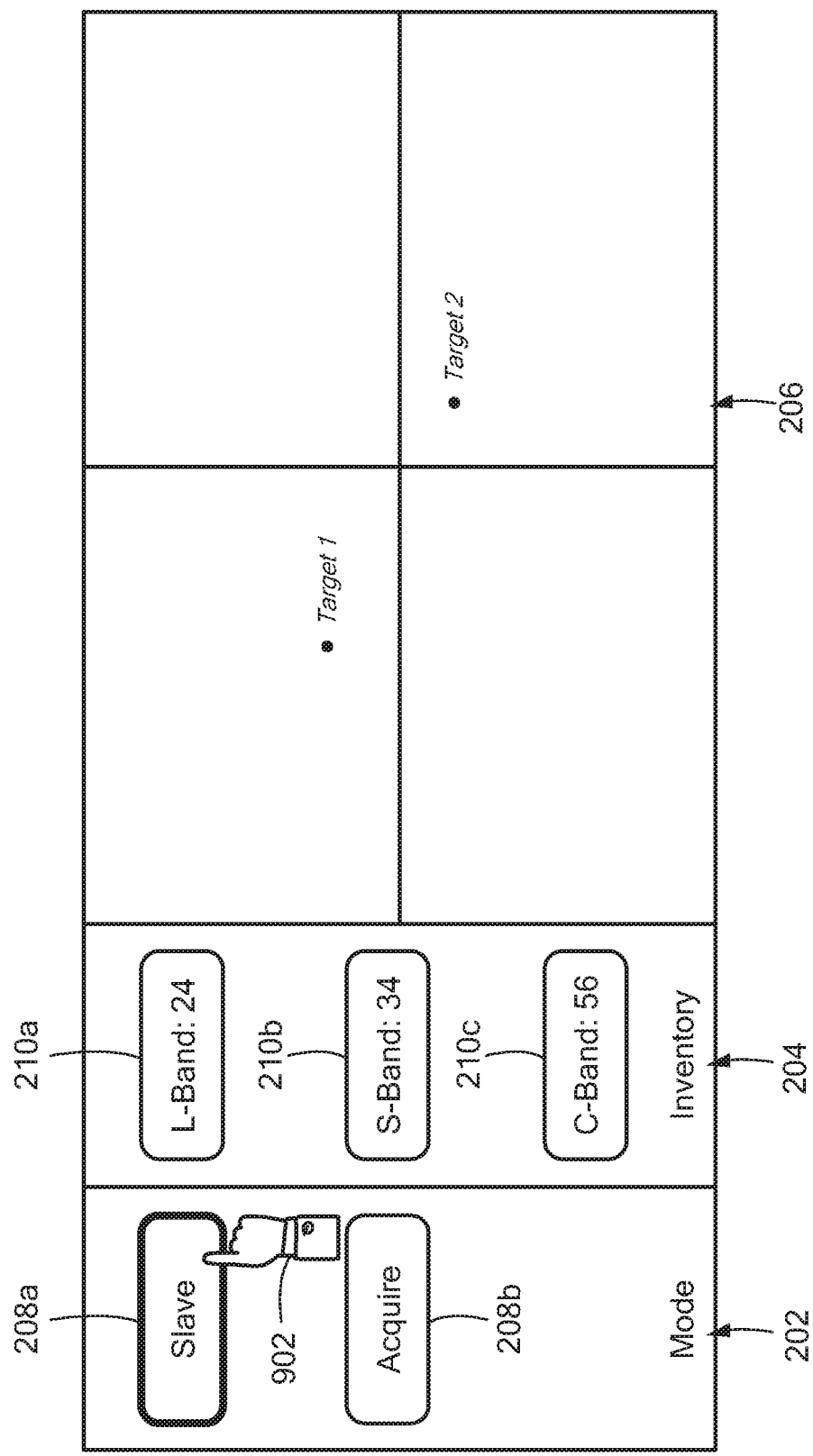
Figure 10:
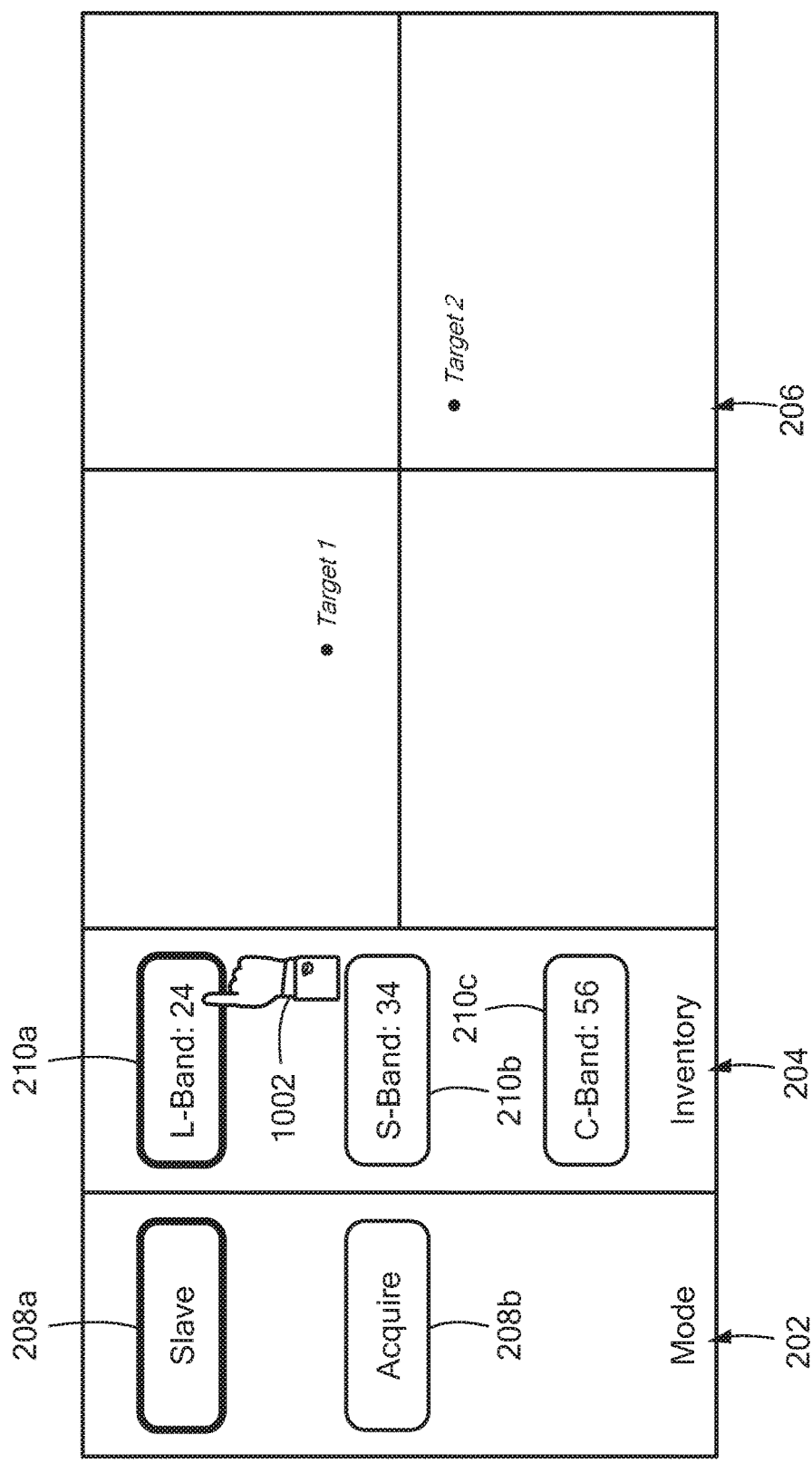

As shown in FIG. 9, an operator of the system selects slave icon 208a of operating mode window 202, for example by a touch gesture represented by hand icon 902. For example, the touch gesture to select slave icon 208a might be a single tap. Selecting slave icon 208a indicates that the operator desires a selected beam to be formed by phased array system 100 and operated in slave mode. As shown in FIG. 10, after selecting slave icon 208a as shown in FIG. 9, the operator selects one of the available beams from beam inventory window 204, for example selecting an L-band beam (e.g., L-band beam icon 210a) by a touch gesture represented by hand icon 1002. Selecting L-band beam icon 210a indicates that the operator desires an L-band beam to be formed by phased array system 100 and operated in slave mode.

Figure 11:
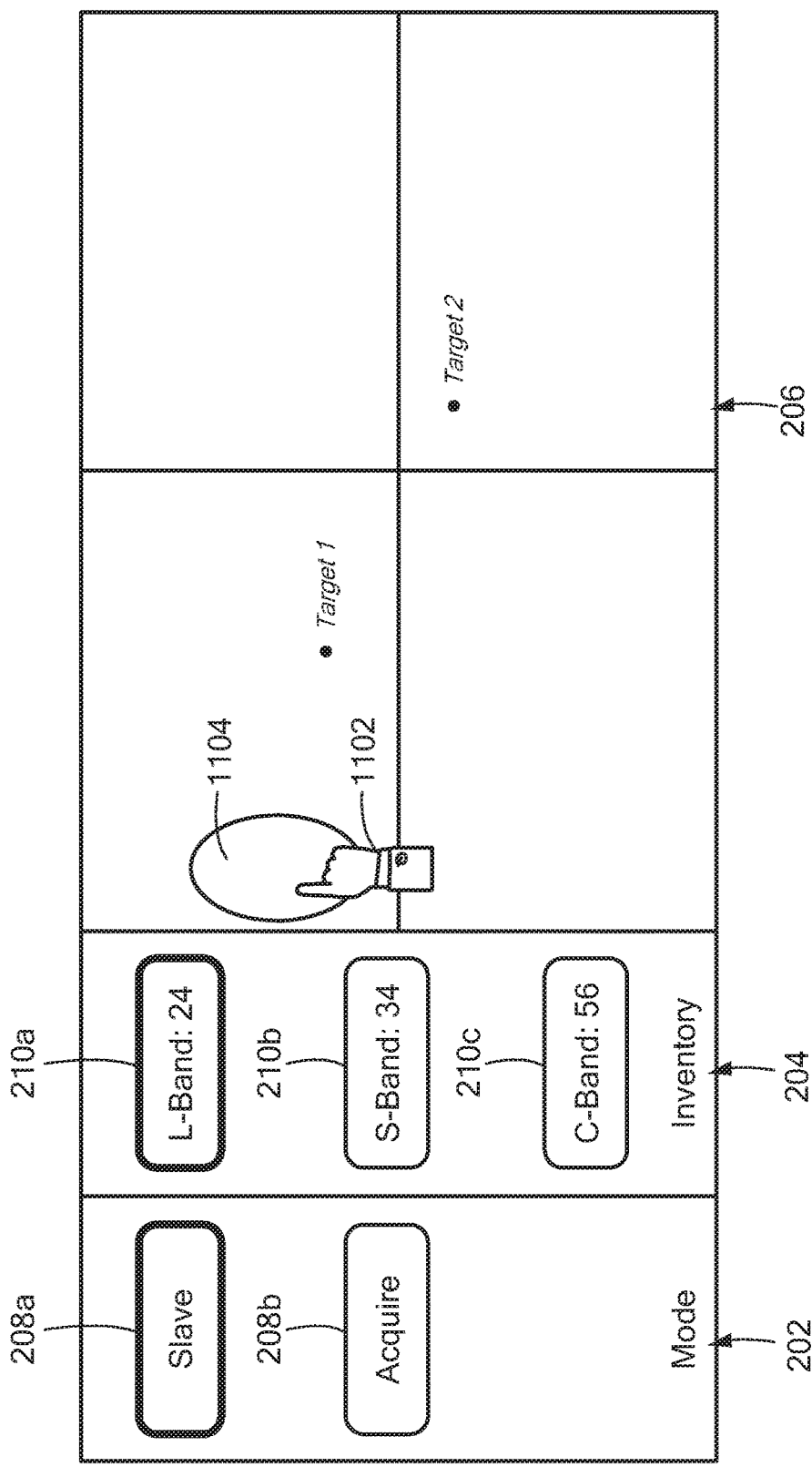

In some embodiments, the touch gesture to select L-band beam icon 210a might be to tap L-band beam icon 210a and then drag the beam into scan volume window 206, as shown in FIG. 11. For example, the operator might drag the beam to a particular region of scan volume window 206 (the region representing an azimuth and elevation for the formed beam), as represented by hand icon 1102. A formed beam is represented in scan volume window 206, for example by beam icon 1104. Releasing the drag gesture instructs phased array system 100 to form the beam at the azimuth and elevation corresponding to the region where the beam was dropped, and phased array system 100 operates the beam in slave mode (e.g., to monitor the azimuth and elevation without attempting to automatically acquire a target).

Figure 12:
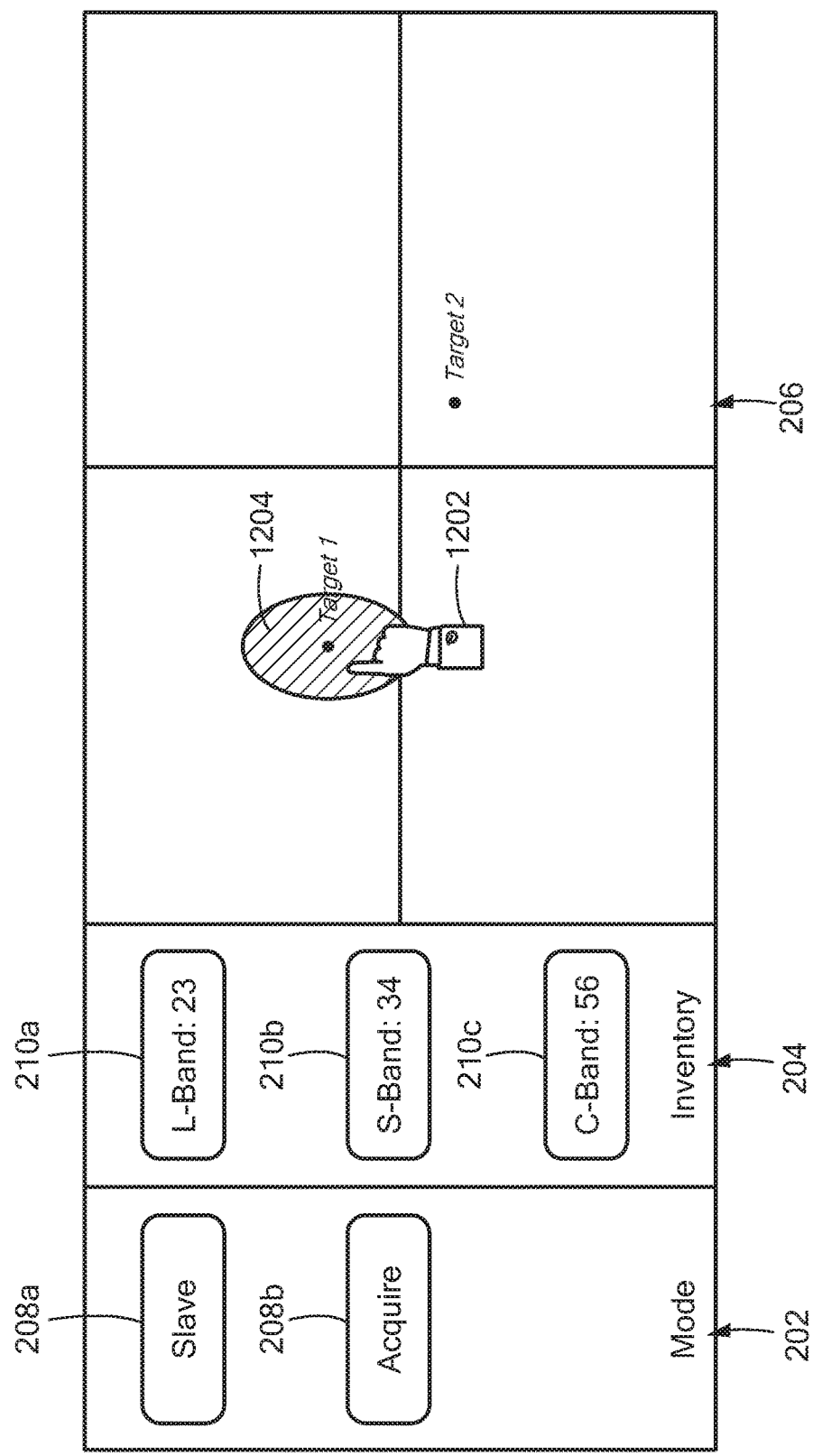

As shown in FIG. 12, a formed beam that has acquired and is tracking a target (e.g., represented by beam icon 1204) can be selected by the operator to be torn down (e.g., de-formed or turned off), for example if tracking the target is no longer necessary. In some embodiments, the touch gesture to tear down a beam might be to double tap the beam icon 1204, as represented by hand icon 1202, which instructs phased array system 100 to tear down the beam.

Alternatively, tapping and holding a formed beam that has acquired and is tracking a target (e.g., represented by beam icon 1204) might allow an operator to steer a beam away from or around an unintended target. For example, as shown in FIG. 12, if target 1 is an incorrect or unintended target, the operator might press beam icon 1204 and drag the beam away from target 1 and toward the intended target. Releasing the drag gesture instructs phased array system 100 to move or steer the beam to the azimuth and elevation corresponding to the region where the beam was dropped, and phased array system 100 operates the beam in acquire mode to acquire the intended target (e.g., target 2).

Thus, described embodiments allow an operator to instruct phased array system 100 to form a beam in a space (e.g., azimuth and elevation) represented by the location of a touch gesture in the scan volume. This allows the operator to easily locate beams without using a joystick, keyboard or other similar controls or specifying x-y or spiral raster coordinates. Further, visual or other feedback of the operational status of phased array system 100 can be provided to the operator in approximately real-time as the screen(s) of control stations 102 are refreshed.

Figure 13:
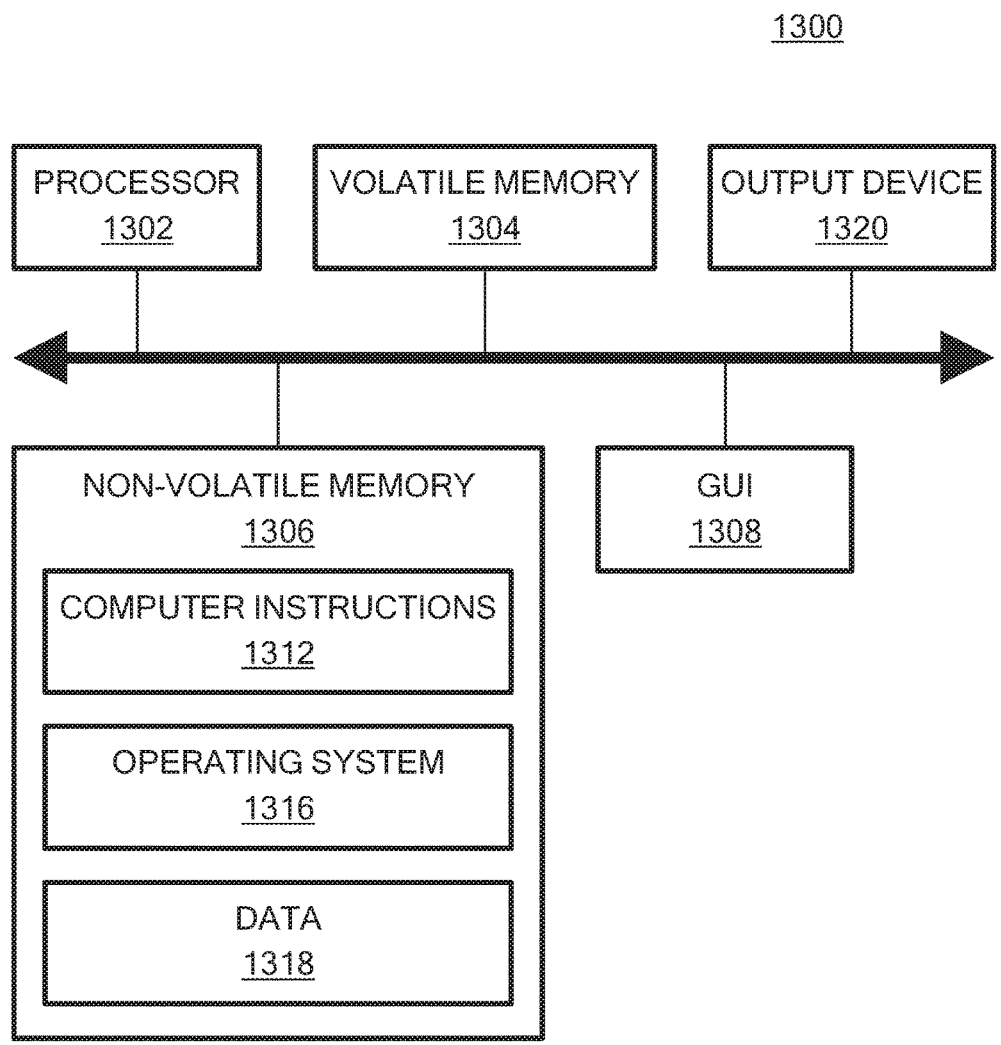
FIG. 13 is a block diagram showing a hardware architecture of a control station of the phased array system of FIG. 1.

Referring to FIG. 13, in some embodiments, control stations 102(1)-102(n) are implemented as one or more computers. As shown, computer 1300 includes processor 1302, volatile memory 1304 (e.g., RAM), non-volatile memory 1306 (e.g., a hard disk drive or solid state drive), graphical user interface (GUI) 1308 (e.g., a mouse, a keyboard, a display, etc.) and input/output (I/O) device 1320 that sends commands to, and receives tracking data from, phased array system 100 (e.g., via communication network 106). Non-volatile memory 1306 stores computer instructions 1312, an operating system 1316 and data 1318 such that, for example, the computer instructions 1312 are executed by the processor 1302 out of volatile memory 1304 to perform all or part of control process 400. Program code may be applied to data entered using an input device of GUI 1308 or received from phased array system 100 by I/O device 1320 (e.g., via communication network 106 to perform process 300 and to generate output information.

Process 300 is are not limited to use with the hardware and software of FIG. 14 and might find applicability in any computing or processing environment and with any type of machine or set of machines that is capable of running a computer program. Process 300 may be implemented in hardware, software, or a combination of the two.

Processor 1302 might be implemented by one or more programmable processors executing one or more computer programs to perform the functions of the system. As used herein, the term "processor" is used to describe an electronic circuit that performs a function, an operation, or a sequence of operations. The function, operation, or sequence of operations can be hard coded into the electronic circuit or soft coded by way of instructions held in a memory device. A "processor" can perform the function, operation, or sequence of operations using digital values or using analog signals.

In some embodiments, the "processor" can be embodied in an application specific integrated circuit (ASIC). In some embodiments, the "processor" can be embodied in a microprocessor with associated program memory. In some embodiments, the "processor" can be embodied in a discrete electronic circuit. The "processor" can be analog, digital or mixed-signal.

While the exemplary embodiments have been described with respect to processes of circuits, described embodiments might be implemented as a single integrated circuit, a multi-chip module, a single card, or a multi-card circuit pack. Further, as would be apparent to one skilled in the art, various functions of circuit elements might also be implemented as processing blocks in a software program. Such software might be employed in, for example, a digital signal processor, micro-controller, or general purpose computer.

Some embodiments might be implemented in the form of methods and apparatuses for practicing those methods. Described embodiments might also be implemented in the form of program code embodied in tangible media, such as magnetic recording media, hard drives, floppy diskettes, magnetic tape media, optical recording media, compact discs (CDs), digital versatile discs (DVDs), solid state memory, hybrid magnetic and solid state memory, or any other machine-readable storage medium, wherein, when the program code is loaded into and executed by a machine, such as a computer, the machine becomes an apparatus for practicing the claimed invention.

Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a processing device, the program code segments combine with the processor to provide a unique device that operates analogously to specific logic circuits. Such processing devices might include, for example, a general purpose microprocessor, a digital signal processor (DSP), a reduced instruction set computer (RISC), a complex instruction set computer (CISC), an application specific integrated circuit (ASIC), a field programmable gate array (FPGA), a programmable logic array (PLA), a microcontroller, an embedded controller, a multi-core processor, and/or others, including combinations of the above. Described embodiments might also be implemented in the form of a bitstream or other sequence of signal values electrically or optically transmitted through a medium, stored magnetic-field variations in a magnetic recording medium, etc., generated using a method and/or an apparatus as recited in the claims.

Reference herein to "one embodiment" or "an embodiment" means that a particular feature, structure, or characteristic described in connection with the embodiment can be included in at least one embodiment of the claimed subject matter. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the words "exemplary" and "illustrative" are used herein to mean serving as an example, instance, or illustration. Any aspect or design described herein as "exemplary" or "illustrative" is not necessarily to be construed as preferred or advantageous over other aspects or designs. Rather, use of the words "exemplary" and "illustrative" is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing the embodiments and are not intended to limit the claims in any way. Such terms, do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements. Signals and corresponding nodes or ports might be referred to by the same name and are interchangeable for purposes here.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

As used herein, the term "predetermined," when referring to a value or signal, is used to refer to a value or signal that is set, or fixed, in the factory at the time of manufacture, or by external means, e.g., programming, thereafter. As used herein, the term "determined," when referring to a value or signal, is used to refer to a value or signal that is identified by a circuit during operation, after manufacture.

It should be understood that the steps of the exemplary methods set forth herein are not necessarily required to be performed in the order described, and the order of the steps of such methods should be understood to be merely exemplary. Likewise, additional steps might be included in such methods, and certain steps might be omitted or combined, in methods consistent with various embodiments.

It will be further understood that various changes in the details, materials, and arrangements of the parts that have been described and illustrated herein might be made by those skilled in the art without departing from the scope of the following claims.

We claim:

1. A computer-implemented method for controlling a phased array system by a distributed control system comprising one or more control stations, the method comprising:
   displaying, by each of the one or more control stations, a control interface of the phased array system, the control interface comprising a status window, a beam window and a scan window;
   instructing the phased array system to operate in a selected operating mode, the operating mode selected from among at least one selectable operating mode of the phased array system displayed in the status window of the control interface, wherein the at least one selectable operating mode of the phased array system comprises at least one of an open loop mode and a closed loop mode;
   receiving a selection in the beam window of at least one beam, the at least one beam selected from among one or more selectable beams of the phased array system available to track a target;
   instructing, through each of the one or more control stations, the phased array system to form the selected at least one beam;
   assigning, through each of the one or more control stations, the formed beam to (i) track a selected target detected by the phased array system, or (ii) monitor a selected location;
   displaying, in the scan window of the control interface, (i) targets tracked by the phased array system, and (ii) beams generated by the phased array system:
   receiving a selection of the closed loop operating mode of the phased array system in the status window;
   receiving a selection of an available beam in the beam window;
   receiving a drag of the selected beam from the beam window over a desired target in the scan window;
   assigning the selected beam to track the desired target,
   after receiving the selection of the closed loop mode and receiving the selection of the available beam, instructing the phased array system to form the selected beam at a determined azimuth and elevation; and
   in response to telemetry data of the formed beam, automatically adjusting the azimuth and elevation of the formed beam to acquire and track a desired target.

2. The method of claim 1, further comprising:
   updating the one or more beams displayed in the beam window when a beam is assigned to track the desired target.

3. The method of claim 1, further comprising:
   receiving a selection of the open loop operating mode of the phased array system in the status window;
   receiving a selection of an available beam in the beam window;
   receiving a drag of the selected beam from the beam window over a desired region in the scan window; and
   assigning the selected beam to monitor the desired region.

4. The method of claim 3, further comprising:
   after receiving the selection of the open loop mode and receiving the selection of the available beam, instructing the phased array system to form the selected beam at a determined azimuth and elevation.

5. The method of claim 3, further comprising:
updating the one or more beams displayed in the beam window when a beam is assigned to monitor the desired region.

6. The method of claim 1, further comprising:
displaying, in the scan window, telemetry data of at least one assigned target; and providing feedback indicative of the telemetry data, wherein the feedback is at least one of: audible feedback, visual feedback and haptic feedback.

7. The method of claim 1, wherein the one or more control stations are in communication via a communications network and wherein the one or more control stations are located in separate geographic locations.

8. The method of claim 7, wherein the one or more control stations are located in separate geographic locations than the phased array system.

9. The method of claim 1, wherein the at least one beam is operable in at least one of: an L-frequency band, an S-frequency band, and a C-frequency band.

10. The method of claim 1, wherein each of the one or more control stations comprises a touchscreen, the method further comprising:
receiving input from an operator of the control station by one or more touch gestures, wherein the one or more touch gestures include at least one of: a tap, a double tap, a multiple tap, a tap and hold, a tap and drag, a release, and a drag and drop.

11. The method of claim 10, wherein:
receiving a single tap selects an operating mode of the phased array system;
receiving a double tap turns off a generated beam;
receiving a tap and hold shows information associated with a generated beam;
receiving a tap and drag selects an available beam and moves the available beam over a target or region, and a release generates the beam and assigns the beam to monitor the target or region.

12. The method of claim 1, further comprising acquiring a target along a dynamic path, the dynamic path set by an operator of the phased array system.

13. The method of claim 1, further comprising steering an assigned beam around an unintended or interfering target.

14. A distributed control system for a phased array system, the control system comprising:
one or more distributed control stations, the control stations each comprising at least one screen;
each control station configured to:
display, on the at least one screen, a control window of the phased array system, the control window comprising a status window, a beam window, and a scan window;
display, in the status window, at least one selectable operating mode of the phased array system, wherein the at least one selectable operating mode of the phased array system comprises at least one of: an open loop mode and a closed loop mode;
display, in the beam window, one or more beams of the phased array system available to track a target;
operate the phased array system in a selected operating mode;
receive a selection input selecting at least one beam and cause the phased array system to form the selected at least one beam;
assign the formed beam to (i) track a selected target detected by the phased array system, or (ii) monitor a selected location;
display, in the scan window, (i) targets tracked by the phased array system, and (ii) beams formed by the phased array system;
cause the phased array system to track each of the assigned targets and monitor each of the assigned locations,
receive a selection input selecting the closed loop operating mode of the phased array system in the status window;
receive a selection input selecting an available beam in the beam window;
receive a selection input dragging the selected beam from the beam window over a desired target in the scan window;
cause the phased array system to generate the selected beam at a determined azimuth and elevation;
assign the selected beam to track the desired target and, in response to telemetry data of the formed beam, automatically adjust the azimuth and elevation of the formed beam to acquire and track the desired target; and
update the one or more beams displayed in the beam window when a beam is assigned to track the desired target.

15. The control system of claim 14, each control station further configured to:
receive a selection input selecting the open loop operating mode of the phased array system in the status window;
receive a selection input selecting an available beam in the beam window;
receive a selection input dragging the selected beam from the beam window over a desired region in the scan window;
cause the phased array system to generate the selected beam at a determined azimuth and elevation;
assign the selected beam to monitor the desired region; and
update the one or more beams displayed in the beam window when a beam is assigned to track the desired target.

16. The control system of claim 14, wherein:
at least one of the one or more control stations provides feedback indicative of the telemetry data, the feedback comprising at least one of: audible feedback, visual feedback and haptic feedback;
the one or more control stations are in communication via a communications network; and
each of the one or more control stations comprises a touchscreen configured to receive input from an operator of the control station by one or more touch gestures.

* * * * *